(12) United States Patent
Lord

(10) Patent No.: US 6,593,976 B1
(45) Date of Patent: Jul. 15, 2003

(54) AUTOMATIC RETURN TO INPUT SOURCE WHEN USER-SELECTED CONTENT REAPPEARS IN INPUT SOURCE

(75) Inventor: William P. Lord, Fishkill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/504,760

(22) Filed: Feb. 14, 2000

(51) Int. Cl.⁷ .................................................. H04N 5/44
(52) U.S. Cl. ...................... 348/731; 348/553; 725/38; 725/58; 725/22; 725/19
(58) Field of Search ................................ 348/731, 732, 348/907, 906, 558, 460, 461, 553; 725/22, 20, 19, 14, 39, 42, 58, 116, 38, 28, 17, 18, 21; 707/6, 104.1; 386/1, 83

(56) References Cited

U.S. PATENT DOCUMENTS

| | | | | |
|---|---|---|---|---|
| 4,230,990 A | * | 10/1980 | Lert et al. ................ | 348/473 |
| 4,677,466 A | * | 6/1987 | Lert et al. ................ | 455/67.1 |
| 4,857,999 A | * | 8/1989 | Welsh ...................... | 725/20 |
| 4,979,047 A | * | 12/1990 | Wine ........................ | 348/569 |
| 5,162,905 A | * | 11/1992 | Itoh et al. ................ | 725/22 |
| 5,436,653 A | * | 7/1995 | Ellis et al. ............... | 725/22 |
| 5,612,729 A | * | 3/1997 | Ellis et al. ............... | 348/907 |
| 5,621,454 A | * | 4/1997 | Ellis et al. ............... | 348/907 |
| 5,668,917 A | | 9/1997 | Lewine .................... | 386/52 |
| 5,699,107 A | * | 12/1997 | Lawler et al. ............ | 348/906 |
| 5,708,477 A | | 1/1998 | Forbes et al. ............. | 348/552 |
| 5,870,754 A | | 2/1999 | Dimitrova et al. ........ | 707/104 |
| 5,973,723 A | * | 10/1999 | DeLuca .................... | 725/34 |
| 6,002,443 A | * | 12/1999 | Iggulden .................. | 348/460 |
| 6,037,969 A | * | 3/2000 | Lim et al. ................. | 725/28 |
| 6,341,374 B2 | * | 1/2002 | Schein et al. ............. | 725/141 |
| 6,400,406 B1 | * | 6/2002 | Kim .......................... | 348/460 |
| 6,404,977 B1 | * | 6/2002 | Iggulden .................. | 348/460 |

FOREIGN PATENT DOCUMENTS

| | | |
|---|---|---|
| DE | 4106246 C1 | 3/1992 |
| EP | 0366001 A2 | 5/1990 |
| EP | 0384388 A1 | 8/1990 |
| WO | 9627983 A1 | 9/1996 |
| WO | 9820675 A1 | 5/1998 |
| WO | 9855943 A2 | 12/1998 |
| WO | 9931879 A1 | 6/1999 |

* cited by examiner

*Primary Examiner*—John Miller
*Assistant Examiner*—Jean W. Désir
(74) *Attorney, Agent, or Firm*—Steven R. Biren (57) ABSTRACT

A method of returning to a program that is being received on a first channel is disclosed. The method includes storing data that characterizes at least one portion of the program. After storing this data, the user is free to change channels. The system automatically switches back to the first channel when data that characterizes a subsequent portion of the program matches the stored data.

22 Claims, 7 Drawing Sheets

|  |  |  |  |  |  |
|---|---|---|---|---|---|
| 4 | 1 | 0 | 2 | • • • | 1 |
| 0-5 | 5-10 | 10-15 | 15-20 |  | 175-180 |

FIG. 7A

| | 0-5 | 5-10 | 10-15 | 15-20 | | 175-180 |
|---|---|---|---|---|---|---|
| 150-180 | 0 | 0 | 0 | 0 | • • • | 0 |
| 120-150 | 2 | 0 | 0 | 1 | • • • | 1 |
| 90-120 | 0 | 0 | 0 | 0 | • • • | 0 |
| 60-90 | 0 | 0 | 0 | 1 | • • • | 0 |
| 30-60 | 1 | 0 | 0 | 0 | • • • | 0 |
| 0-30 | 1 | 1 | 0 | 0 | • • • | 0 |

FIG. 7B

AUTOMATIC RETURN TO INPUT SOURCE WHEN USER-SELECTED CONTENT REAPPEARS IN INPUT SOURCE

FIELD OF THE INVENTION

The present invention relates to an automatic channel-selecting system that returns a receiver to a particular channel after the user has tuned away from that particular channel. The present invention may be used, for example, to avoid commercials in conventional television and radio broadcasts. More specifically, while the user is watching or listening to a first program that is being broadcast on a first channel, the user indicates interest in the first program either explicitly (e.g., by pressing a button) or tacitly (e.g., by measuring dwell time). After the indication of interest, the user is free to change channels as desired, and to watch or listen to other programs. Meanwhile, the system monitors the original channel. When content that matches the first program reappears on the first channel, the system automatically reverts to the first channel.

BACKGROUND OF THE INVENTION

Television commercials are perceived by many people as an annoying interruption to their television programs. When a commercial appears, some viewers simply wait for the commercials to end, and continue watching the original channel until their program returns. During this time, however, these viewers will be watching something in which they are not interested.

Other viewers will "channel surf" as soon as a commercial appears, in the hopes of finding something that interests them more than the commercial. While these viewers may ultimately find something of interest, channel surfers can never be sure when the original program has returned to the original channel. Thus, when the channel surfer returns to the original channel, he may find that the commercials are still running, or that he has missed part of his program. Even worse, if the channel surfer gets carried away watching a program on an alternate channel, he can miss a large portion of his program WO 99/31879 is an example of a system that eliminates commercials automatically by changing channels as a soon as a commercial is detected. But operation of this system interferes with the user's control of the system, because the initial departure from the original channel occurs automatically. In addition, the user can not explicitly specify a particular type of content to which the system will later return.

European Patent Application EP0366001A2 is an example of a system that provides users with more control and allows the users to select a channel that will be automatically returned to after channel surfing. It operates by having the user enable a timer before changing channels. In response to the enabling of the timer, the system stores the channel being watched. The user is then free to change channels as desired. After a predetermined time (e.g., 60, 90, or 120 seconds), the timer times out, and the system automatically switches back to the stored channel. While the EP0366001A2 system prevents users from being carried away watching an alternate program, it cannot correct the problem of returning a viewer to the original channel to soon or too late, since the decision to return to the original channel is based on elapsed time. A solution that would return the viewer to the original program only when the commercial has actually ended would be highly desirable.

SUMMARY OF THE INVENTION

The present invention enables a user to store data that characterizes a portion of a program, and to subsequently change channels as desired. When data that characterizes a subsequent portion of the program matches the stored data, the channel switches back to the original program.

One aspect of the present invention relates to a method of returning to a television program being received on a first channel. The method includes the steps of accepting a storage command from a user, and storing data that characterizes the program in response to the storage command. The user is then permitted to change channels. After the user has changed channels, the method detects when data that characterizes a second portion of a broadcast on the first channel matches the stored characterizing data. When a match is detected, the television is returned to the first channel.

Another aspect of the present invention, which is not limited to television, relates to a method of returning to a first program being received by a receiver via a first channel. The method includes the steps of accepting a storage command from a user, and storing data that characterizes the program in response to the storage command. The user is then permitted to change channels. After the user has changed channels, the method detects when data that characterizes a second portion of a broadcast on the first channel matches the stored characterizing data. When a match is detected, the receiver is returned to the first channel.

DETAILED DESCRIPTION OF THE PREFERRED EMBODIMENTS

Figure 1:
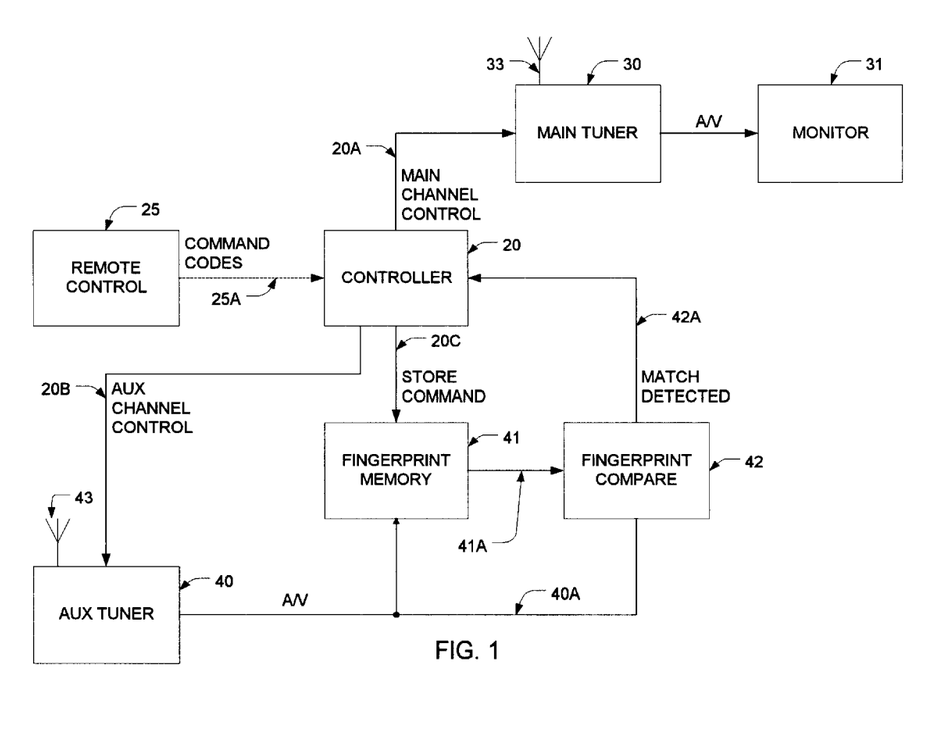
FIG. 1 is a hardware block diagram for a preferred embodiment of the present invention.

The embodiment illustrated in FIG. 1 includes a main tuner 30 that is preferably supplied with a composite multi-channel signal from a signal source such as an antenna 33. Examples of suitable composite multi-channel signals include a superposition of a plurality of radio frequency transmissions arriving at the antenna 33, or the superposition of a plurality of video signals, each modulated by a different carrier, on a cable (not shown).

An audio/video (A/V) output of the main tuner 30 is provided to the monitor 31. Preferably, the monitor 31 displays the video information on a suitable output device such as a cathode ray tube, liquid crystal display panel, plasma display panel, thin film transistor panel, light emitting diode array, or the like. In addition, the monitor 31 converts the audio portion of the audio/video signal from the main tuner 30 into sound that can be perceived by an observer (using, e.g., an audio amplifier and speakers). Details of implementing the main tuner 30 and the monitor 31 are well known to persons skilled in the relevant arts.

A controller 20 controls the operation of the entire system, preferably by implementing the process steps described below in connection with FIGS. 3 and 4. The controller 20 may be implemented using a microprocessor cooperating with a program-store memory and random access memory (not shown). The implementation of such microprocessor-based controllers is well known to persons skilled in the relevant arts. Alternatively, the controller 20 may use hard-wired logic to implement the process steps described below in connection with FIGS. 3 and 4.

Figure 2:
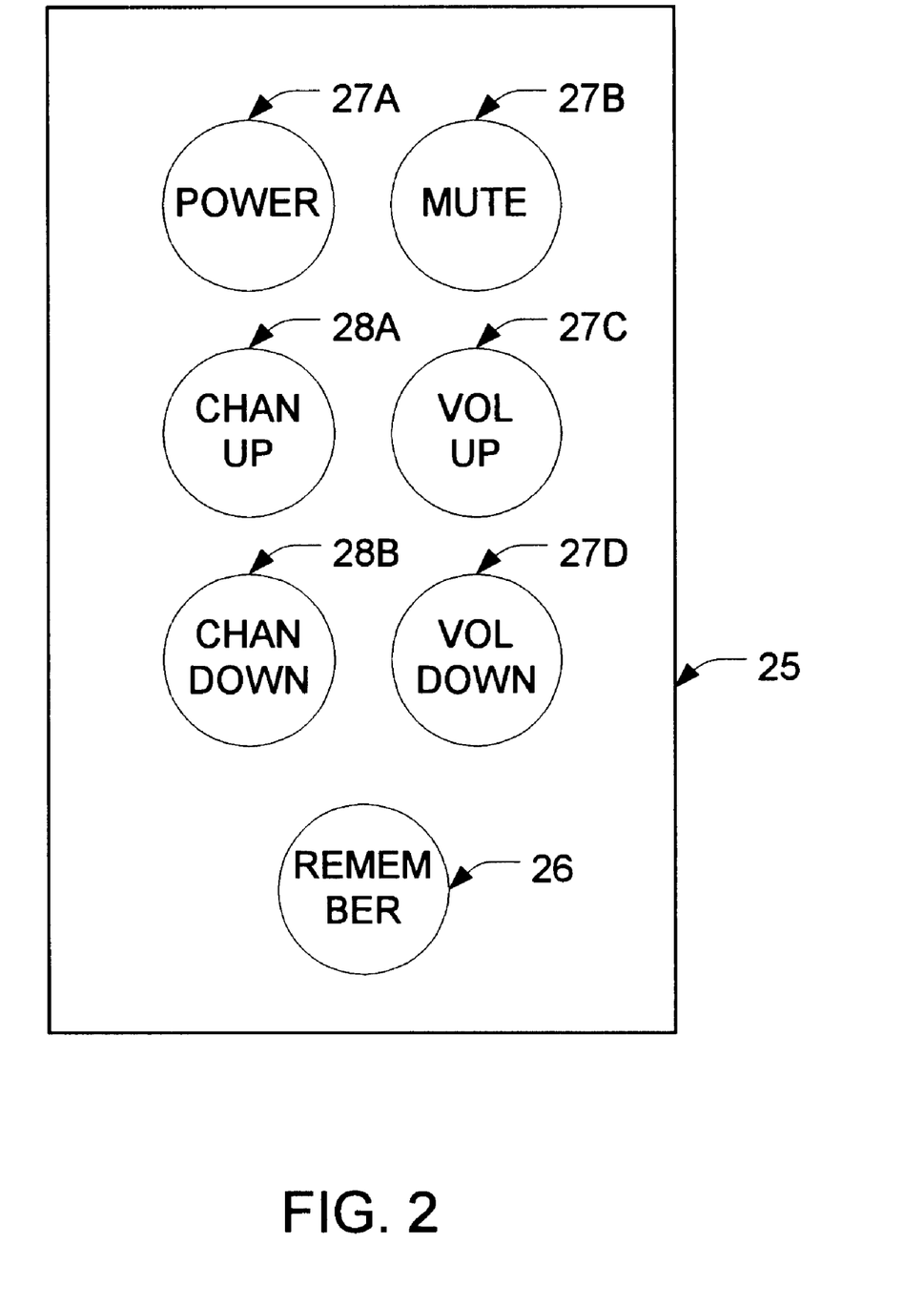
FIG. 2 is a diagram of a remote control keypad arrangement used with the FIG. 1 embodiment.

Preferably, the controller 20 receives command codes 25a from a remote control unit 25. FIG. 2 illustrates a suitable keyboard arrangement for the remote control 25. The command codes 25a may be transmitted from the remote control 25 to the controller 20 using any suitable approach including, for example, transmitting a unique sequence of infrared pulses from the remote control 25 to the controller 20 in response to the pressing of each key 26, 27a–27d, 28a–28b on the remote control 25. A wide variety of alternative arrangements for implementing control of the controller 20 can be readily envisioned, including, for example, using radio frequency or ultrasonic transmissions, or a wired connection between the remote control 25 and the controller 20.

The hardware configuration of the remote control 25 itself is preferably similar to the hardware configuration of conventional remote control units. Any suitable arrangement of conventional remote control keys may be included on the remote control 25. For example, the illustrated remote control 25 includes control buttons for power 27a, mute 27b, volume up and down 27c–d, and channel up and down 28a–b.

Returning now to FIG. 1, when the controller 20 receives a command code 25a from the remote control 25 that corresponds to any of the conventional remote control buttons 27a–d, 28a–b the controller 20 sends appropriate commands to the main tuner 30 or to the monitor 31 to carry out the command requested by the user. For example, to change the channel on the main tuner 30, the controller 20 would send a suitable main channel control signal 20a to the main tuner 30. Details of implementing a tuner than can be tuned by applying a channel control signal are well known to persons skilled in the relevant arts. Similarly, to change the volume on the monitor 31, the controller 20 would send a suitable volume control signal (not shown) to the monitor 31.

In addition to the conventional command keys 27a–d, 28a–b, the remote control 25 also includes a remember button 26, which is used to actuate the remember mode. When the remember button 26 on the remote control 25 is pressed, a unique command code 25a corresponding to the remember button 26 is sent from the remote control 25 to the controller 20. Operation of the controller 20 upon receipt of this remember command code is described below in connection with FIGS. 3 and 4.

The preferred hardware configuration also includes an auxiliary tuner 40. The input signal for the aux tuner 40 may be provided by its own antenna 43 or cable (not shown), or via the same antenna 33 or cable that is used for the main tuner 30. The controller 20 preferably selects the channel to which the aux tuner 40 is tuned using the aux channel control signal 20b, preferably in a manner similar to the main tuner 30.

The audio/video output 40a of the auxiliary tuner 40 is provided to the fingerprint memory 41 and the fingerprint compare unit 42. Optionally, although not so illustrated, the fingerprint memory 41 and the fingerprint compare unit 42 may be implemented in software in the controller 20.

When the fingerprint memory 41 receives a store command 20c from the controller 20, the fingerprint memory 41 will store a "fingerprint" of the A/V signal 40a. This "fingerprint" characterizes or classifies the A/V signal 40a at the time the store command was received, and is ultimately used as a basis for comparing various signals with one another. Preferably, signals that are similar will have similar fingerprints, so that the similarity of the signals themselves can be evaluated by comparing the similarity of the fingerprints.

Fingerprinting may be implemented based on the video portion of the A/V signal 40a using any of a variety of suitable techniques. In one embodiment, the stored fingerprint may simply be a block of data corresponding to a single video frame (either black and white or full color), which is captured and stored in a suitable memory when the store command 20c is received. In another embodiment, the stored fingerprint may comprise video data for a plurality of video frames.

In more preferred embodiments, the fingerprints contain less information than the original signal, so that less processing power will be needed to make fingerprint comparisons. For example, the frame data in the above-described embodiments may be compressed, or the fingerprint may be based on a motion detection analysis of the differences between temporally separated frames to determine a characteristic type of motion. In other embodiments, a function that characterizes either a single video frame or a plurality of video frames may be used as the fingerprint. The computed value or values that result when the function is applied to the inputted video frame or frames may then be stored as the fingerprint in the fingerprint memory 41.

One example of a function suitable for this purpose can be found in U.S. Pat. No. 5,870,754 (Dimitrova et al.), which is incorporated herein by reference, and which describes extracting signatures from video clips based on luminance, chrominance, and motion vector values.

Another example of a suitable function for implementing fingerprinting, also developed by Dimitrova, is image isolation. Image bitmaps may be used to generate a shape-dependent feature vector, which is applied to a back propagation neural network (BPNN). The feature vector provides greater emphasis on overall image shape while being relatively insensitive to variability problems. In the technique for isolating image regions, connected component structures are defined based on the edges detected. Since edge detection produces far fewer pixels overall than binarizing the entire field occupied by a symbol, the process of generating connected components can be much more rapid. The selection of feature space also enhances recognition speed. With simulated BPNNs, the size of the input vector can seriously affect throughput. Care should be taken to be selective with regard to the components used from the selected feature space. Of course, heterogeneous feature spaces may be formed by combining mixes of different metrics such as moments and line-segment features. Also, computational economies may be realized where the selected features share computational steps.

A chosen feature vector is generated by the appropriate image analysis. A variety of these can be used. A number of different feature spaces are suitable for use with this approach. Examples of some suitable feature spaces, which are size and rotation invariant and are considered particularly suitable to video image classification using a BPNN classifier, are described in detail below.

Figures 6A, 6B:
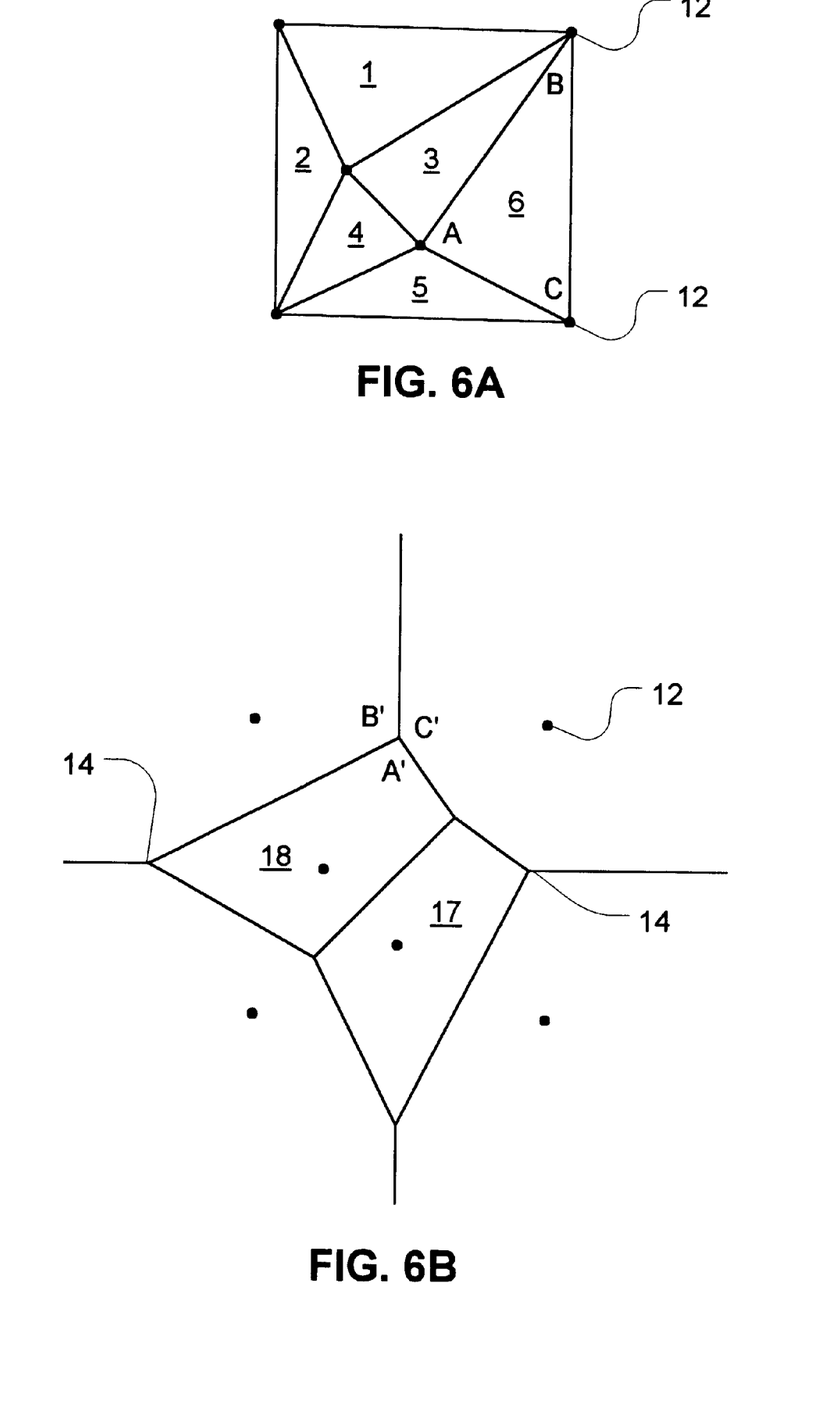
FIGS. 6A and 6B illustrate Delaunay triangulation and Voronoy diagram stages in an image filtering step in an image classification process according to an embodiment of the present invention.
Figure 7A:
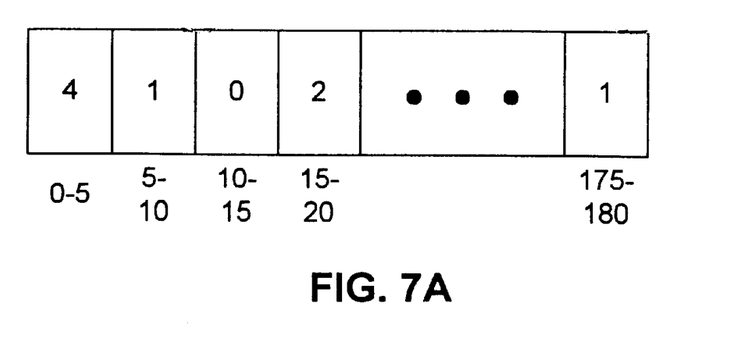
FIGS. 7A and 7B illustrate an angle histogram-type feature space according to an embodiment of the present invention.
Figure 7B:
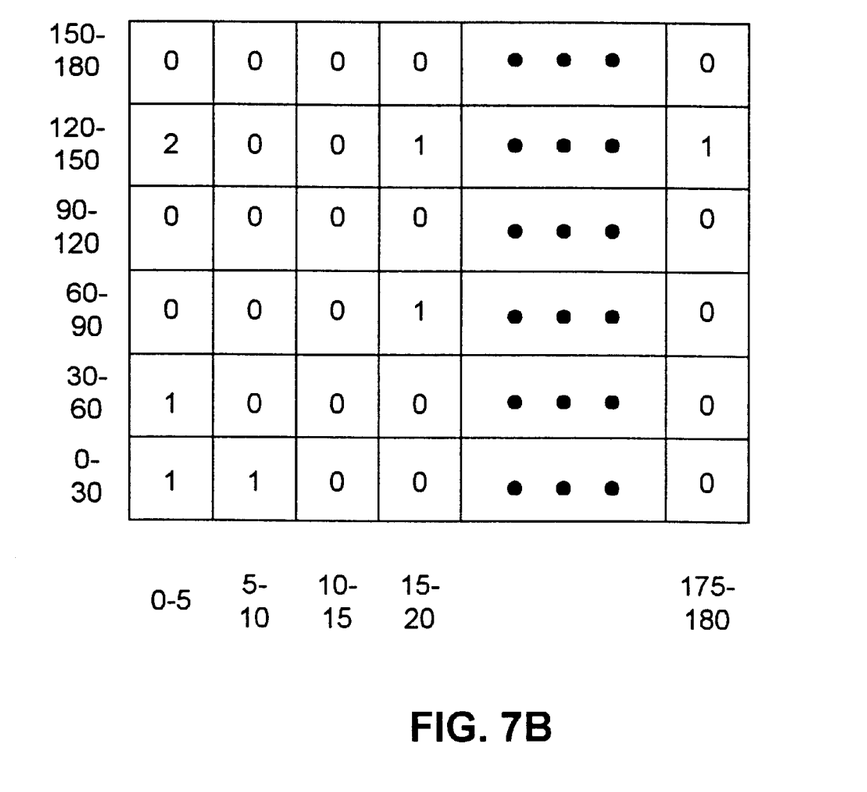

A first feature space is derived from an original image 150 by, for example, forming a binary version 155 of the image 150, locating feature points 165–169 of the binarized image 155, and extracting those feature points 165–169 (as illustrated by FIGS. 5A–5D). Note that while only a small number of feature points are illustrated, a larger number would be used in practice. Referring now to FIGS. 6A and 6B, a Delaunay triangulation (FIG. 6A) or a Voronoy diagram (FIG. 6B) is derived from the feature points 12. An image processor (not shown) performs the triangulation and then, for each triangle 1–6, generates an inventory to the internal angles. It then uses this inventory to generate a histogram of the angles, as shown illustrated in FIG. 7A. The histogram simply represents the frequency of angles A, B, and C of a given size range in the set of triangles 1–6 defined by the triangulation. Note that other triangulation methods or polygon-generating methods can be used. For example, referring to FIG. 6B, a set of Vorony polygons 17 and 18 can be used to define a set of angles A', B', and C', each associated with a vertex 14 of the Voronoy diagram. The angle histogram that results serves as the feature vector for the particular character from which the features points were derived Other size and rotation invariant features may be added to the above feature space, for example, the number of horizontal lines, the number of crossing points, the number of endpoints, holes, inflection points, midpoints etc. Another variation on the angle histogram is the use of only the two largest (or smallest) of the interior angles of each triangle. Still another variation of the angle histogram is to use a two dimensional angle histogram instead of the one-dimensional angle histogram. For example, referring to FIG. 7B, the largest (or smallest) pair of angles for each triangle defines an ordered pair (ordered by size) for each triangle in the Delaunay triangulation (or each vertex of the Voronoy diagram). The first element of each ordered pair is used for the first dimension of the matrix and the second element, for the second dimension of the matrix. In this way, the association between angles is preserved as information for training and classifying using the BPNN classifier Still another feature spaced considered particularly suitable for the video image BPNN classifier is an array of size-invariant moments. Each feature vector is applied to the trained BPNN which outputs various candidate classes and hopefully, depending on the inputs, one very strong candidate. If there are multiple candidate images, a best guess may be made by combining the probability output by the BPNN with frequency of use data for a presumed context. Such data may be compiled from different types of material, for example, television advertising transcripts, printed material, streaming or downloaded files from the Internet. One way to combine such data is to weight the probabilities output by the BPNN by the corresponding probabilities associated with frequency-of-use statistics.

The use of numerous alternative functions can be readily envisioned, including, for example, locating large blocks of a relatively uniform color in the video frame (corresponding, for example, to the grass playing fields of baseball and football fields).

Fingerprinting may also be based on the audio portion of the A/V signal 40a, or even based on closed-caption information. Preferably, when audio fingerprinting is used, the fingerprint is computed based on at least a full second of audio information extracted from the A/V signal 40a. Characteristics of this audio information may then be stored as the fingerprint. For example, the audio signal may be transformed into a plurality of discrete frequency components using a discrete Fourier transform, and the resulting frequency components may be used as the fingerprint. Numerous alternative functions (e.g., conventional voice fingerprinting techniques) may also be used.

Once a fingerprint has been stored in the fingerprint memory 41, a fingerprint compare unit 42 monitors the A/V signal 40a generated by the aux tuner 40. This monitoring uses the same fingerprinting approach used by the fingerprint memory 41. When the fingerprint compare unit 42 detects that the fingerprint of the A/V signal 40a is sufficiently similar to the fingerprint stored in the fingerprint memory 41, the fingerprint compare unit will send a match-detected signal 42a to the controller 20.

With most pattern matching techniques, an exact correspondence with the stored fingerprint is not required to generate a fingerprint match—the fingerprints need only be sufficiently similar. For example, in a baseball game, if a fingerprint is stored when a team with white uniforms is fielding and two blue-uniformed runners are on base, a fingerprint when the blue-uniformed team is fielding would be sufficiently similar to result in a match. The pattern matching technique preferably includes a confidence measure that indicates the probability of a match. When the confidence level exceeds a confidence threshold, a match is declared.

Optionally, the fingerprint compare unit 42 can adjust the confidence thresholds as a function of time. For example, because most commercials occur in 30 second increments, the fingerprint compare unit 42 can decrease the required confidence measure for a match detection at 60, 90, and 120 second intervals after the first channel change, so as to increase the probability of detecting a match at those intervals. Alternatively, instead of relying on fixed times, the system can learn the expected commercial intervals for a given program. The techniques for detecting when the original program has returned to the original channel may be combined with conventional commercial-recognizing techniques by changing the confidence threshold when the commercial-recognizing process determines that a commercial is likely to have ended.

Optionally, the fingerprint compare unit 42 can slowly decrease the confidence threshold required for a match as the time from the first channel change increases, so that as the commercial lasts longer and longer, it becomes easier and easier to return to the original channel.

Optionally, the fingerprint compare unit 42 may check for matches against a family of fingerprints, and generate a match-detected signal 42a when any member of that family of fingerprints is matched. This may be useful for programs that have multiple sets (e.g., the sitcom "Frasier", in which most scenes take place in either the living room, the kitchen, or the studio). When this option is implemented and the remember button is pressed, a fingerprint of the scene is captured and stored in the fingerprint memory 41. A database of fingerprint families (not shown) is then checked. If the captured fingerprint appears in the database, then the fingerprint compare unit 42 compares the fingerprint of the A/V signal 40a to each fingerprint in the captured fingerprint's family. A match-detected signal 42a is generated when the confidence measure for any one of these comparisons exceeds the confidence threshold. Thus, when the remember button is pressed when a kitchen scene is being broadcast, the system will be able to return to the program even if a studio scene appears after the commercial. Optionally, these fingerprint families may include fingerprints of common opening clips (e.g., an external shot of the space ship in Star Trek).

Figure 3:
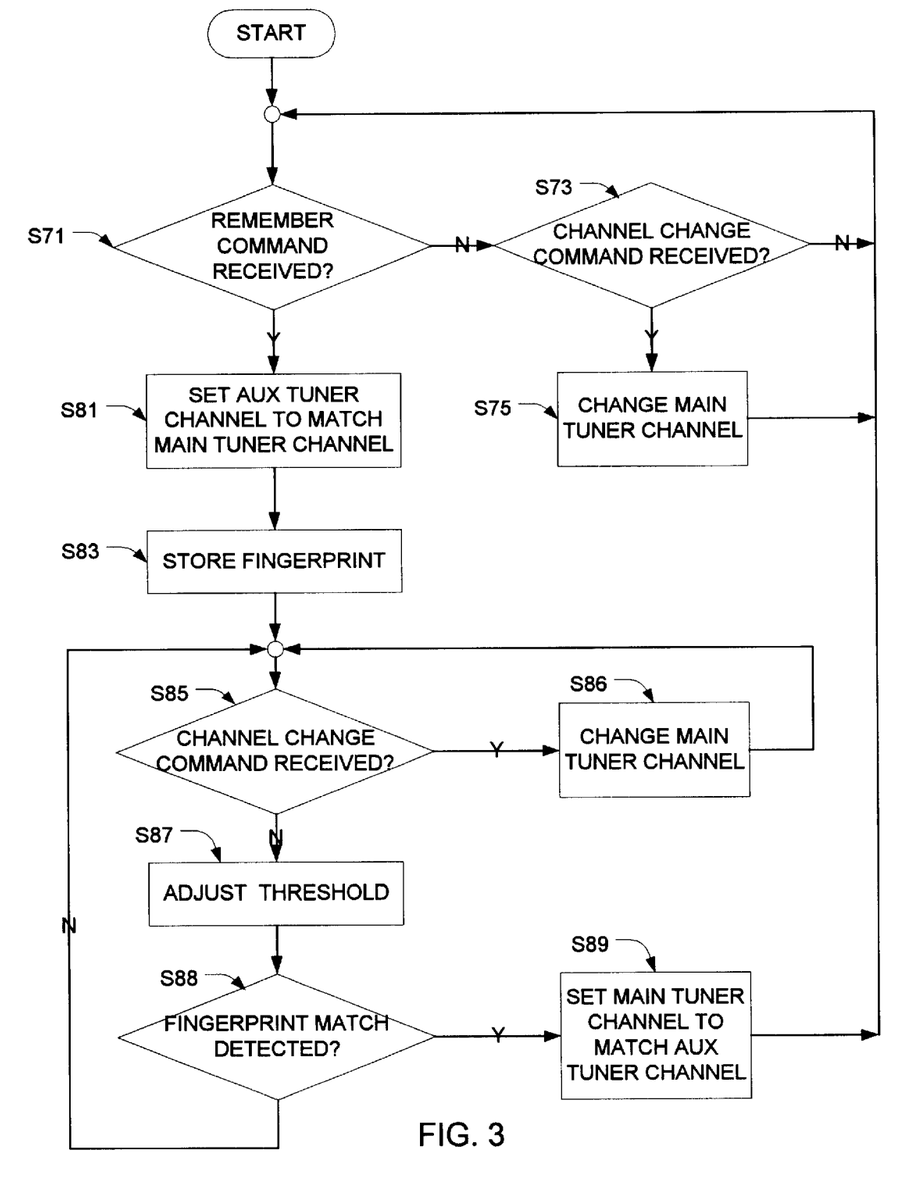
FIG. 3 is a flowchart of a first preferred process performed by the controller of the FIG. 1 embodiment.

FIG. 3 is a flowchart of a preferred process that may be implemented by the FIG. 1 embodiment, under control of the controller 20. These processes respond to pressing of the remember button 26 and the channel change buttons 28 on the remote control 25, since the remember button 26 produces a remember command, and the channel change buttons 28 produce channel change commands. In this embodiment, the user is instructed to press the remember button 26 when he wants the system to remember a program.

In steps 71, a test is performed to determine if a remember command has been received from the remote control 25. If the remember command has not been received, processing continues at step S73, where a test is performed to determine whether a channel change command has been received from the remote control 25. Channel change commands are generated by the user by pressing the channel up and channel down keys 28a–b on the remote control 25, or by pressing direct entry keypad keys (not shown) on the remote control. If a channel change command is not detected in step S73, processing returns to step S71. Processing will continue to loop through steps S71 and S73 in this manner until either a remember command or a channel change command is received.

When a channel change command is detected in step S73, processing continues at step S75, where the channel on the main tuner 30 is changed in accordance with the user's request. Preferably, the controller 20 implements this channel change by sending main channel control signal 20a to the main tuner 30. The channel presented to the user will then change, just as it does on conventional TV sets. At this point, the automatic channel return feature is not enabled, because the remember key has not yet been pressed.

If the remember key 26 has been pressed, the test performed in step S71 will indicate that a remember command has been received, and initialization of the remember mode will occur, starting at step S81. First, in step S81, the auxiliary tuner channel is set to match the main tuner channel. Preferably, the controller 20 accomplishes this by issuing an aux channel control command 20b to the aux tuner 40, as described above. Next, in step S83, a fingerprint of the A/V output 40a of the aux tuner 40 is captured and stored in the fingerprint memory 41. Preferably, the controller 20 accomplishes this by issuing a store command 20c to the fingerprint memory 41, as described above. Processing then continues at step S85.

Once the system has set the aux tuner 40 to the desired channel and stored a fingerprint of the desired program, the user is free to change channels as desired. This user accomplishes this by pressing the channel change buttons 28. Anytime the user changes a channel by pressing a channel change button 28, the remote control 25 will issue a corresponding channel change command, which is received by the controller 20.

In step S85, the controller 20 tests to determine whether a channel change command has been received. If a channel change command has been received, processing continues at S86. In step S86, the controller 20 changes the channel on the main tuner by issuing a main channel control signal 20a to the main tuner 30. This causes the channel displayed on the monitor 31 to change in accordance with the channel change button 28 on the remote control 25 pressed by the user. The user then sees the channel changing on the monitor 31 in the same way that it would ordinarily change on an ordinary television set.

Importantly, when the channel setting of the main tuner 40 is changed in step S86, the channel setting of the aux tuner 40 is not changed, and the aux tuner remains set to the original channel that was being viewed when the remember button was pressed. Because of this, the fingerprint compare unit 42 can monitor the original channel and wait for a fingerprint that matches the fingerprint stored in the fingerprint memory 41.

If, in step S85, a channel change command is not detected, processing continues at step S87 where the confidence thresholds are adjusted as required, (e.g., as a function of time, as described above). Next, in step S88, a test is performed to determine whether a fingerprint match has been detected by the fingerprint compare unit 42. For example, if the remember button was pressed while a baseball game was being displayed, the fingerprint stored in the fingerprint memory 41 would characterize video or audio components of the baseball game. During commercials, the fingerprint of the A/V signal 40a generated by the aux tuner 40 will not match the fingerprint stored in the fingerprint memory 41, and processing returns to step S85 to continue testing for channel change commands and fingerprint matches. When the baseball game returns, however, the fingerprint of the A/V signal 40a will match the stored fingerprint. When a match is detected, the fingerprint compare unit 42 will generate a match detected signal 42a, and send that signal to the controller 20. Preferably, detection of matches is inhibited until at least one channel change has occurred, so that a matches will not be acted upon before channel surfing has begun.

When the controller 20 receives the match detected signal 42a from the fingerprint compare unit 42, processing continues at step S89 where the main tuner channel is set to match the channel setting of the auxiliary tuner 40. Preferably, this is accomplished by having the controller 20 send a main channel control command 20a to the main tuner 30. In response to this command, the main tuner 30 (which has been set to a different channel by the channel surfing activities of the user) is restored to the original channel that was being watched by the user when the user pressed the remember button 26 on the remote control 25.

Figure 4:
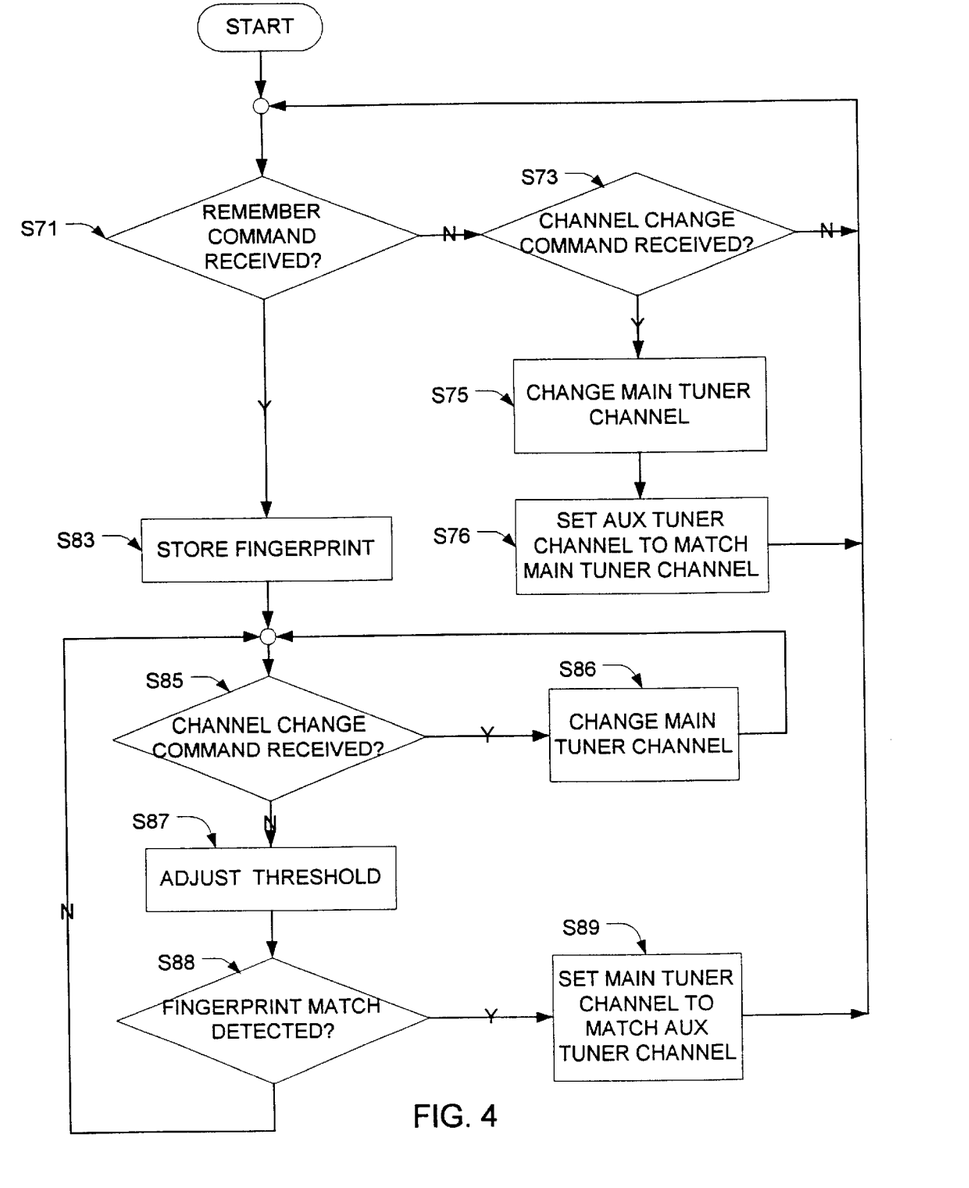
FIG. 4 is a flowchart of a second preferred process performed by the controller of the FIG. 1 embodiment.
Figure 5A:
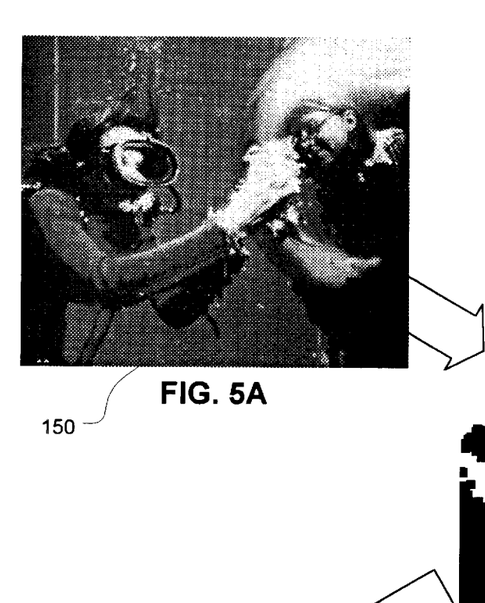
FIGS. 5A–5D illustrate the filtering of a segmented image to derive a feature vector precursor.
Figure 5B:
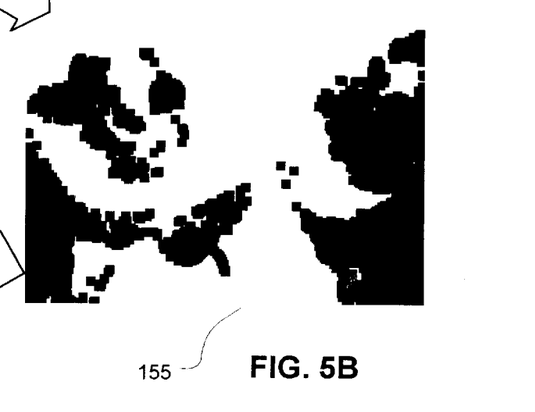
Figure 5C:
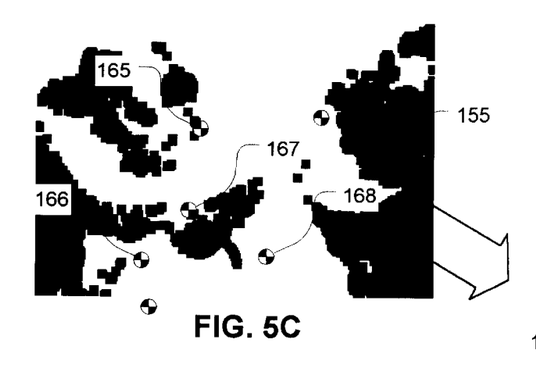
Figure 5D:
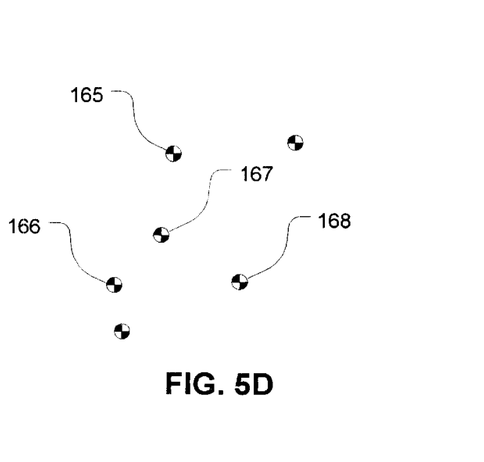

FIG. 4 illustrates an alternative process that may be implemented using the same hardware configuration shown in FIG. 1. Steps S71–S75 and steps S83–S89 in this embodiment are similar to the corresponding steps of FIG. 3. In the FIG. 4 embodiment, however, instead of waiting until the remember command is received before setting the auxiliary tuner channel, the auxiliary tuner channel is set to match the main tuner channel in step S76 each time the channel is changed on the main tuner (i.e., before channel surfing begins).

When the auxiliary tuner channel tracks the main tuner channel before the remember command arrives in this manner, the system's response to the remember command can optionally be modified to fingerprint the program that was being displayed a certain amount of time before the remember button was pressed (e.g., 10 seconds before the remember button was pressed). A suitable buffer (not shown) must be provided to store the program's fingerprints in anticipation of the remember command's arrival.

This feature is useful, for example, when a user forgets to press the remember button while the desired show was being displayed, and only remembers to do so after the show has cut to a commercial. In the first embodiment, pressing the remember button after the commercial has started would cause the system to store a fingerprint of the commercial, and the system would not be able to return to the desired program. But in this embodiment, pressing the remember button 26 on the remote control 25 causes the system to store the fingerprint from the buffer (not shown) into the fingerprint memory 41. This results in the storage of a fingerprint corresponding to the actual program being watched (e.g., a baseball game). The system can therefore return to that program.

Optionally, this retroactive remember command may be implemented in conjunction with the standard remember command discussed above by, for example, providing two buttons on the remote control 25: one for implementing the standard remember function, and one for implementing the retroactive remember function.

In another alternative embodiment, the system tracks the amount of time a user has spent watching a given television show (referred to hereinafter as "dwell time"). The system interprets the fact that the dwell time has exceeded a predetermined threshold as a tacit indication that the user wished to remember a program. This tacit indication replaces the pressing of the remember button 26 in the above-described embodiments. When the dwell time exceeds the threshold, the system stores a fingerprint, as described above. Optionally, additional fingerprints may be collected as the dwell time continues, and a channel return may be executed when any stored fingerprint is subsequently matched. Preferably, fingerprints that immediately precede a channel change, (e.g. by less than 5 seconds) should be discarded to avoid storing a fingerprint of a commercial.

The present invention may be applied to media other than television, such as radio and Internet broadcasts. Of course, when an audio-only format such as radio is used, only the audio information would be available to implement the fingerprinting storage and comparison. The present invention may also be used in picture-in picture systems to switch picture windows when a return to the original program is detected.

While the present invention has been explained in the context of the preferred embodiments described above, it is to be understood that various changes may be made to those embodiments, and various equivalents may be substituted, without departing from the spirit or scope of the invention, as will be apparent to persons skilled in the relevant art.

What is claimed is:

1. A method of returning to a first television program being received on a first channel, the method comprising the steps of:
    recognizing a storage initiation condition while the user's television is tuned to the first channel;
    storing data that characterizes a first portion of the first television program in response to the storage initiation condition recognized in said recognizing step;
    permitting the user to tune the user's television set to one or more second channels;
    detecting, after the user has tuned the user's television to the one or more second channels, when data that characterizes a second portion of a broadcast on the first channel matches the data that characterizes the first portion stored in said storing step; and
    tuning the user's television to the first channel responsively to a result of said detecting step.

2. The method of claim 1, wherein said recognizing step includes the step of determining whether a dwell time has exceeded a predetermined threshold.

3. The method of claim 1, wherein said recognizing step includes the step of recognizing a switch actuation.

4. The method of claim 1, wherein a match is detected in said detecting step when the data that characterizes the second portion is sufficiently similar to the data that characterizes the first portion.

5. The method of claim 1, wherein a match is detected in said detecting step when a confidence measure for the comparison exceeds a confidence threshold.

6. The method of claim 5, wherein the confidence threshold is adjusted in said detecting step so that a probability of detecting a match will increase at preselected intervals of time subsequent to a first channel change.

7. The method of claim 5, wherein the confidence threshold is adjusted in said detecting step so that a probability of detecting a match will increase gradually with time subsequent to a first channel change.

8. The method of claim 1, wherein in said storing step, the first portion of the first television program is a portion that is broadcast at substantially a same time as the storage initiation condition is recognized in said recognizing step.

9. The method of claim 1, wherein in said storing step, the first portion of the first television program is a portion that is broadcast at least five seconds prior to a time when the storage initiation command is accepted in said recognizing step.

10. The method of claim 1, wherein the data that characterizes the first portion in said storing step and the data that characterizes the second portion in said detecting step are computed based on image angles in video data.

11. The method of claim 10, wherein the computation based on image angles includes Delaunay triangulation.

12. The method of claim 1, wherein the data that characterizes the first portion in said storing step and the data that characterizes the second portion in said detecting step are computed based on audio data.

13. The method of claim 1, wherein the data that characterizes the first portion in said storing step and the data that characterizes the second portion in said detecting step are computed based on motion detected from video data.

14. A method of returning to a first program being received by a receiver via a first channel, the method comprising the steps of:
    accepting a storage initiation command from a user while the user receives information via the first channel;
    storing data that characterizes a first portion of the first program in response to the storage initiation command accepted in said accepting step;
    permitting the user to set the receiver to one or more second channels;
    detecting, after the user has tuned the receiver to the one or more second channels, when data that characterizes a second portion of a broadcast on the first channel matches the data that characterizes the first portion stored in said storing step; and
    setting the user's receiver to the first channel responsively to a result of said detecting step.

15. The method according to claim 14, wherein the receiver comprises a television.

16. The method according to claim 14, wherein the receiver comprises a radio.

17. The method according to claim 14, wherein the receiver comprises an Internet browser.

18. The method of claim 14, wherein said accepting step comprises the step of determining whether a dwell time has exceeded a predetermined threshold.

19. The method of claim 14, wherein said accepting step comprises the step of determining when a switch has been actuated.

20. The method of claim 14, wherein a match is detected in said detecting step when the data that characterizes the second portion is sufficiently similar to the data that characterizes the first portion.

21. The method of claim 14, wherein in said storing step, the first portion of the first program is a portion that is broadcast at substantially a same time as when the storage initiation command is accepted in said accepting step.

22. The method of claim 14, wherein in said storing step, the first portion of the first program is a portion that is broadcast at least five seconds prior to a time when the storage initiation command is accepted in said accepting step.

* * * * *